United States Patent [19]

Gray

[11] 4,394,889
[45] Jul. 26, 1983

[54] MODIFIED SLOWDOWN AND BRAKING OF AN ELEVATOR CAR

[75] Inventor: John E. Gray, Milperra, Australia

[73] Assignee: Otis Elevator Company, Farmington, Conn.

[21] Appl. No.: 261,240

[22] Filed: Mar. 25, 1980

[30] Foreign Application Priority Data

Apr. 5, 1979 [AU] Australia .............................. PD8347

[51] Int. Cl.³ .............................................. B66B 1/32
[52] U.S. Cl. .................................. 187/29 R; 318/480
[58] Field of Search ................. 187/29; 318/313, 314, 318/318, 480, 602, 640

[56] References Cited

U.S. PATENT DOCUMENTS

| | | | |
|---|---|---|---|
| 3,898,545 | 8/1975 | Coppa et al. | 318/313 |
| 3,946,293 | 3/1976 | Feld | 318/314 X |
| 4,061,950 | 12/1977 | Kayanuma | 318/318 X |

FOREIGN PATENT DOCUMENTS

| | | | |
|---|---|---|---|
| 52-43243 | 4/1977 | Japan | 187/29 |
| 52-43244 | 4/1977 | Japan | 187/29 |

Primary Examiner—J. V. Truhe
Assistant Examiner—W. E. Duncanson
Attorney, Agent, or Firm—Robert E. Greenstien

[57] ABSTRACT

In elevator systems where the stop and/or slowdown operations are preset for maximum car velocity the stopping and/or slowdown operations are delayed in proportion to the variation from maximum car velocity in order to compensate for the shorter stopping distance required when the car is moving slower than that maximum velocity. Motor speed is sensed within a revolution to provide a signal which manifests the motor speed. This signal is referenced to a second signal which reflects the motor speed for maximum car velocity. The difference between the two signals is a third signal which is used to control delay circuits which delay transmission of stop and/or slowdown signals to the brake and motor in a prescribed relationship to the magnitude of the difference between the two signals.

21 Claims, 5 Drawing Figures

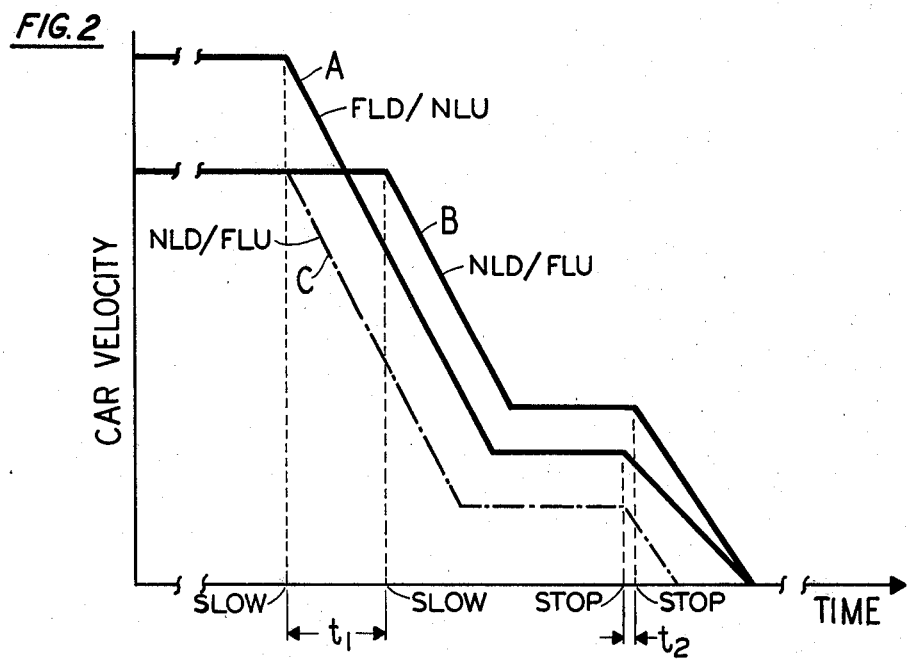
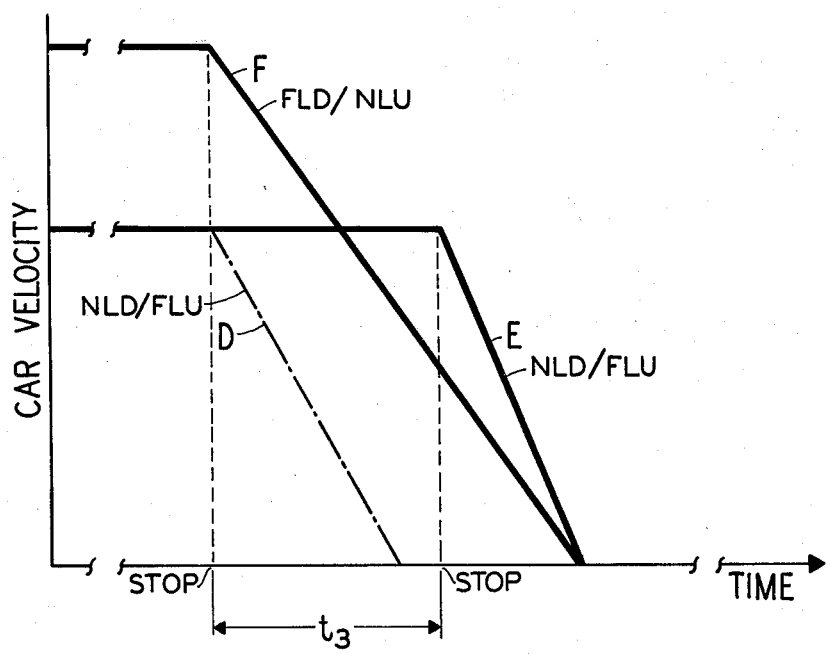

MODIFIED SLOWDOWN AND BRAKING OF AN ELEVATOR CAR

TECHNICAL FIELD

This invention relates to methods and apparatus for controlling the stopping of an elevator car in relation to changes in car velocity due to load changes.

BACKGROUND ART

Low cost elevator systems, such as those found in low rise apartment houses, warehouses and garages, are characterized by very simple, basic car motion control: basically start and stop. Unlike more sophisticated systems, where the car velocity is regulated to obtain a short "flight time" between floors without discomfort to the passengers, less costlier systems do not provide any form of car velocity control. Instead, car velocity is uncontrollably determined by the load: as the load increases, the car ascends slower and descends faster. One slight variation from this occurs in two speed A.C. systems: In those systems motor speed is switched from a high speed to a slowdown speed as the car is stopped. But this does not actually control the car velocity to any real extent because in either mode the load still alters the car velocity.

A typical car stopping sequence in a single speed system is this: As the elevator car approaches the floor, the motor is deactivated, at some distance from the floor level, and the brake is applied; the car then slides to a stop; ideally it smoothly stops precisely at the floor level. The operation of a two speed system is slightly different in that there the motor is slowed at a first distance from the floor level and then, at a second distance, which is closer to the floor, the motor is stopped and the brake is applied. But regardless which of the systems is used, if the car speed varies, that type of performance is very difficult to obtain because in most systems the stopping operation begins at a predetermined distance from the floor level, and that distance is usually determined by considering the maximum car velocity which occurs under full load down and no load up conditions. The maximum car velocity is obviously used because that dictates the maximum stopping distance required to position the car precisely at the floor. But this imposes a prescribed, unalterable car position at which the stopping action commences, regardless of the actual car velocity and, consequently, if the car velocity is less than the predetermined maximum velocity, the car will not stop precisely at the floor level, simply because less stopping distance is required at that lower velocity. If this happens, the car may undershoot the floor and the car then has to be moved slightly. The uneven ride often associated with low cost systems stems from such performance.

Owing to this limitation, a number of remedial approaches have been taken. These approaches, however, have added considerably to cost and complexity of the systems and have not proven to be extremely accurate or reliable, especially for two speed systems. They may be characterized as those which mechanically respond to motor speed and those which electrically measure changes in power consumption; to detect changes in car velocity.

Generally speaking, the mechanical arrangements operate like a governor. As motor speed increases, it causes a contact, which energizes the brake, to be variably positioned, in proportion to the speed, from a cam which is moved to actuate the contact, in order to energize the brake. Depending on the motor speed, the distance required for the cam to move varies in proportion to the motor speed (hence, the load) and thus brake operation is delayed also in proportion to the load. This type of system, however, is not inexpensive, principally due to its rather complex structure. Furthermore, it also imposes a significant maintenance expense for the same reasons.

Those systems following the electrical approach measure the power consumed by the motor; the power varies, of course, roughly in proportion to the load. In its most simple form a power measuring system merely diverts a portion of the motor current through a transformer which produces a voltage at a transformer output. The magnitude of that voltage varies according to the motor current and therefore the load. The magnitude of the transformer output signal is utilized in conventional ways to variably control a timing circuit that initiates the stopping operation. Among the disadvantages of this scheme is that it has very poor sensitivity to actual load variations. Typically, the speed range for an A.C. motor used in a low cost elevator system is between 1000 and 1500 R.P.M.; yet the change in speed between maximum and minimum load conditions is frequently no more than 80 R.P.M. That requires a speed variation sensitivity of roughly 8%. A system of the power measuring type having that sensitivity is expensive. A further complication in the application of these systems is that the speed regulation of the motors in low cost systems is typically coarse (no better than 5% to 7%). Consequently, changes in motor speed due to poor motor speed regulation frequently are mistakenly sensed by these systems as changes in load. Another significant limitation with these systems is their susceptibility to erroneous readings due to high starting currents and line surges and, because of that, it is often necessary to sense both the motor current and its phase angle. But this adds to the complexity of the system and therefore its cost. For all of these reasons, this type of load compensating system is not a very attractive approach in inexpensive elevator systems.

Because these prior art approaches raise reliability, accuracy and service concerns, and add considerable cost, it is not surprising that they have not found wide acceptance as a solution to the car positioning problems found in low cost elevator systems, especially those using single and two speed A.C. motors. Thus there still is a need for a simple, highly reliable, low cost system for controlling the car stopping functions in relation to the car load, and manifestly a system which is equally suited for both retrofit and new equipment applications. Those needs are fulfilled by the method and apparatus of the present invention.

DISCLOSURE OF INVENTION

In accordance with the present invention motor speed is sensed through a tachometer-like arrangement which is coupled to the motor shaft to produce a motor speed (MS) signal whose characteristics change in proportion to motor speed (m) and therefore load. This signal is compared with a reference (REF) signal, during each revolution of the motor. The reference signal reflects the motor speed for maximum car velocity (V MAX) conditions which occur during full load down (FLD) and no load up (NLU). The MS and REF signals are subtracted; the stopping and/or slowdown signals are generated at predetermined stopping distances, based on V MAX, from the floor level, and the difference between the MS and REF signals at that time (when the car is still at a constant velocity) varies a delay in the transmission of stopping and/or slowdown signals to the motor and/or brake. If the car is in fact at V MAX, the difference between the two signals is zero and thus there is no delay because none is needed. But if the car is in fact going a lower speed (i.e. V MIN) (which occurs under no load down (NLD) or full load up FLU)), the difference signal is greater than zero and delays the stop and/or slowdown operations by a predetermined time that is proportionally related to the difference. If car velocity is between V MAX and V MIN, the delay is smaller (due to the smaller difference signal), but nonetheless proportional, to the actual motor speed and therefore the car velocity, which is proportional to the load.

The present invention thus provides a method and apparatus which does not require a mechanical governor arrangement or mechanical sensing of the motor speed; nor does it require sensing motor power consumption in any way. The present invention, in contrast, provides a system which has extremely high accuracy because the signal manifesting the instantaneous motor speed is generated by actually measuring motor speed in time intervals less than time of a full motor rotation. This is particularly important since frequently the motor speeds vary by no more than 8% due to load variations.

A system according to the present invention furthermore is low cost, requires minimal, if any, maintenance and is easily deployed as a retrofit device which can be easily installed in older systems.

A further feature is that it may be implemented with a low cost microprocessor, or alternately, with discrete, digital or analog circuits.

Other features, benefits and qualities of the present invention will no doubt be obvious to one skilled in the art from the following description and drawings.

BRIEF DESCRIPTION OF DRAWINGS

FIG. 2 is a graph of car velocity and time showing the stopping response of a two speed elevator system under two operating conditions; one condition is without any velocity adjustment; the other condition is with load adjustment provided by a system according to the invention;

FIG. 3 is a graph of velocity and time showing the response of a single speed elevator system under the conditions specified for FIG. 2.

BEST MODE FOR CARRYING OUT THE INVENTION

Figure 1:
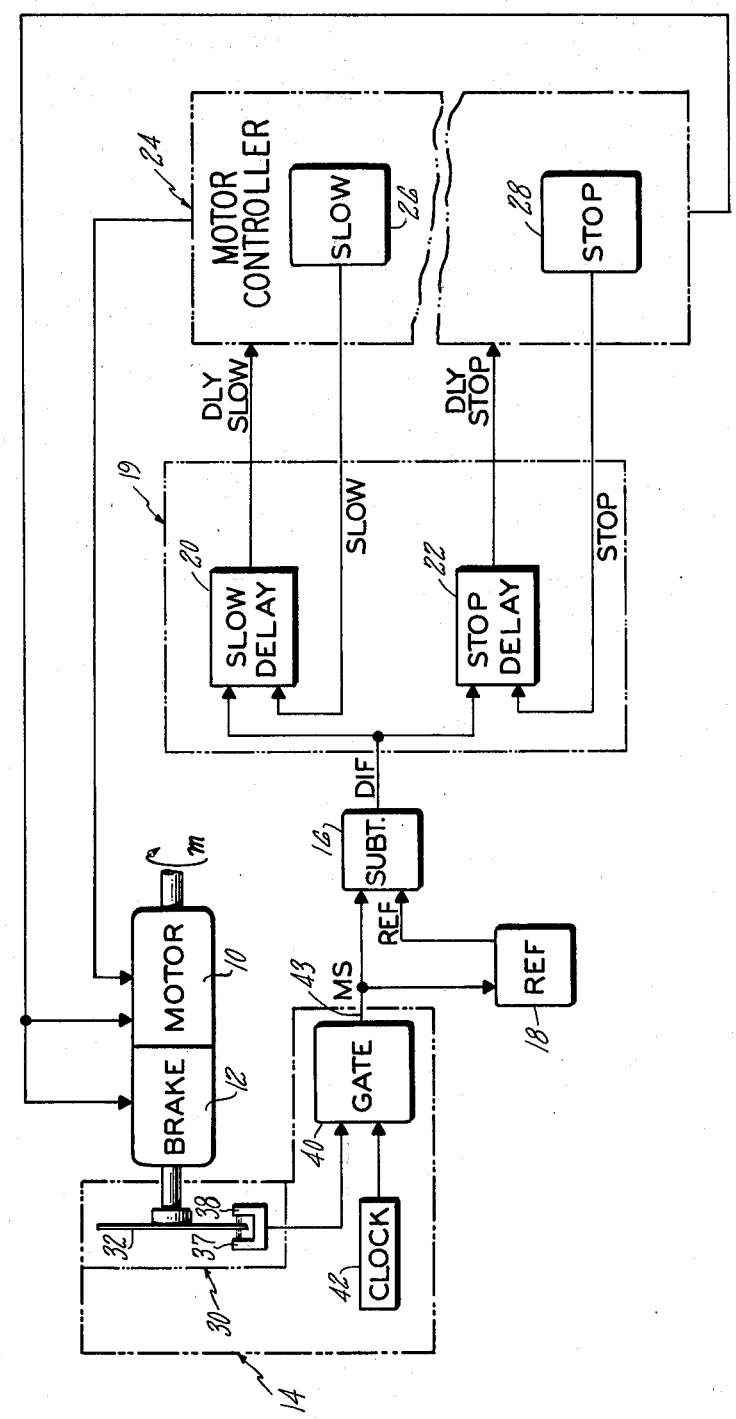
FIG. 1 is a functional block diagram of a motor and brake control system for controlling the operation of a two speed motor and brake in accordance with the teachings of the present invention.

FIG. 1 shows a motor control system for controlling the operation of a two speed motor 10 and a motor brake 12 so as to achieve the overall car velocity profile (during stopping) shown by the curves A and B in FIG. 2, by sensing motor speed which reflects the actual load. Although not shown, the motor is connected to the car by cables to raise and lower it in an elevator shaft. Curve C shows the response for a two speed system without any load adjustment for minimum speed (V MIN) operation. Curve A, on the other hand, is the same with or without the system because no load adjustment is required for the maximum car speed conditions (V MAX) which determine the car position in the shaft at which the unmodified braking and slowdown control signals are generated. Curve B, however, is essentially curve C with delays, following the generation of the control signal for slowdown and stop respectively to compensate for the slower car velocity that requires less stopping time. The motor control system delays the operation of the brake and the slowdown mode (speed switching) of the motor when the car is moving at less than V MAX. The system delays the slowdown operation by a time t1 and the later activation of the brake by a time t2. As stated, there is no delay with respect to the slowdown and stop operations for the full load down (FLD) (i.e. 110% load) and no load up (NLU) as they are preset in the elevator system for those load conditions in that the mechanical devices or other apparatus which generate the control signals (slowdown and stop signals) are operated at particular points in the hoistway, which points are located by considering the stopping time for the car when it is at the V MAX. Whether the car is moving up or down it is necessary to generate the slow and stop commands at a point which is closer to the actual floor as the car velocity decreases from V MAX. The system in FIG. 1 does this by delaying the transmission of the actuating signals to the motor and the brake by the times t1 and t2, respectively, which are varied in the system in FIG. 1 in direct proportion to the change in car speed which results from the change in car load, also called duty load.

FIG. 3, on the other hand, shows the load-velocity response of a single speed motor system, which is one that merely deactivates the motor and simultaneously activates the brake; in other words, one having only a stop mode. Curve D thus reflects the V MIN operation without the introduced delay t3 causing curve E. Curve F, like curve A in FIG. 2, reflects the V MAX operation which the invention does not alter since, as in the two speed system, this operation takes place at a predetermined distance above and below the floor, which distance is also determined from V MAX. In a single speed system a single delay of time t3 is introduced to delay activation of the brake signal and deactivation of the motor. The motor control system shown in FIG. 1 also works with a single speed system because it is continuously generating the proper time delay from the difference between V MAX and actual car velocity (V), and thus, it is simply a matter of selection (determined by whether the motor is single or dual speed) whether to use that time to delay a slowdown signal or the braking signal. In other words, this system has virtually universal application in that it modifies the preset stopping operations or sequences (which are based on V MAX) for the actual velocity (V) by electronically sensing the motor speed during each revolution of the motor shaft.

To achieve these results, the system in FIG. 1 includes a motor speed sensing system 14 for sensing motor shaft speed and producing a motor speed (MS)

signal which reflects the instantaneous motor speed or R.P.M. (m). The MS signal is supplied to the input of a subtractor 16. A generator 18 (i.e. triggered counter) generates a reference speed (REF) signal which corresponds to the particular MS signal produced by the sensing system 14 when the motor speed (n) is at its maximum, which occurs at V MAX (full load down and no load up operation). The REF signal is generated synchronously with the generation of the MS signal. The MS and REF signals are subtracted to produce a difference or error (DIF) signal which reflects the difference (m−n) and hence the difference between the instantaneous car velocity (V) and V MAX. If the car is fully loaded and moving down (FLD), the difference signal is zero. The same is also true if the car is unloaded and moving up (NLU). But if the car is not loaded and moving down (NLD), n is greater than m and therefore will be greater than zero. Stated as car velocity, this means V is less than V MAX.

The DIF signal is applied to a delay system 19 which generates delayed (in proportion to the magnitude of the DIF signal) slowdown (DLY SLOW) and delayed stop (DLY STOP) signals, over the so identified lines, in response to brake and motor control signals (stop (STOP) and slowdown (SLDW) signals) on so named lines, from the motor and brake control 24. The DLY SLOW and DLY STOP signals are applied to the motor and brake control 24 which, in response, changes motor speed (in response to the DLY SLOW signal) and activates the brake and deactivates the motor (in response to the DLY STOP signal). The DIF signal is applied to one input of a first delaying circuit 20 (i.e. a programmable latch) and one input of a second delaying circuit 22, which comprise the delay system 19. The first delay circuit 20 receives the slowdown (SLDW) signal from motor controls 24; these are part of the basic elevator control system and include a slowdown signal generator 26 for producing the SLDW signal and a stop signal generator 28 for generating the STOP signal as the car approaches a floor. The first and second delay circuits 20 and 22 delay the transmission of the DLY SLOW and DLY STOP signals for a time (t1 for the slowdown signal; t2 for the stop signal) corresponding to the instantaneous magnitude of the difference signal, which reflects the instantaneous difference between V MAX and V, as stated previously. When the SLDW signal is generated, it activates (triggers) the delay circuit 20 to read the instantaneous DIF signal then produced by the subtractor 16. After the delay t1, which is proportional to the magnitude of the DIF signal, the delay circuit generates the DLY SLOW signal which is supplied to the motor controls so as to cause the motor to change speed; the motor thus begins to slow down. When the car reaches the predetermined position in the hoistway where the STOP signal is generated, that signal causes the delay circuit 22 to then read the DIF signal then produced. It, delay circuit 22, produces the DLY STOP signal following the delay t2, which is varied by the delay circuit in proportion to the magnitude of the DIF signal read by the delay circuit 22 when the STOP signal is generated. Obviously, during the slowdown sequence the car has slowed down significantly from its normal speed and the DIF signal read by the delay circuit 22 will be greater than the DIF signal read by the delay circuit 20. However, it is merely a matter of appropriate scaling for the delay circuit 22 to provide the proper delay t2 in response to a particular DIF signal and so the delay function should be designed so that when the car is at V MAX, the DIF signal produced when the stop command is generated will cause t2 to be zero. Thus, if the car is in fact moving slower due to a lower weight, the DIF signal (when the stop signal is generated) will be larger, thus causing t2 to have a value other than zero.

Figure 5:
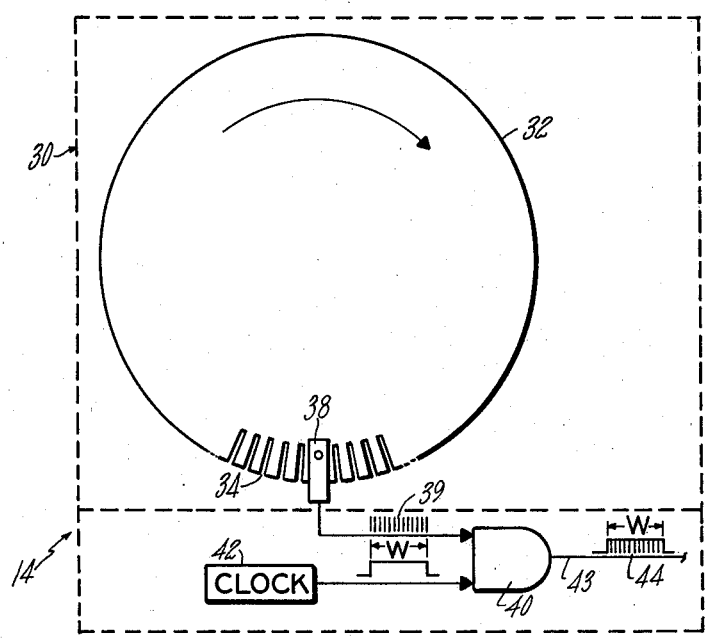
FIGS. 4 and 5 are illustrations of a alternative motor speed sensor systems which can be used in a system according to the invention; each figure includes a partially elevated view of a disc, which can be mounted on a motor shaft, and partially a functional block diagram of an electronic optical sensing system responsive to the rotation of the disc for generating the signals indicative of the speed of rotation of the motor.
Figure 4:
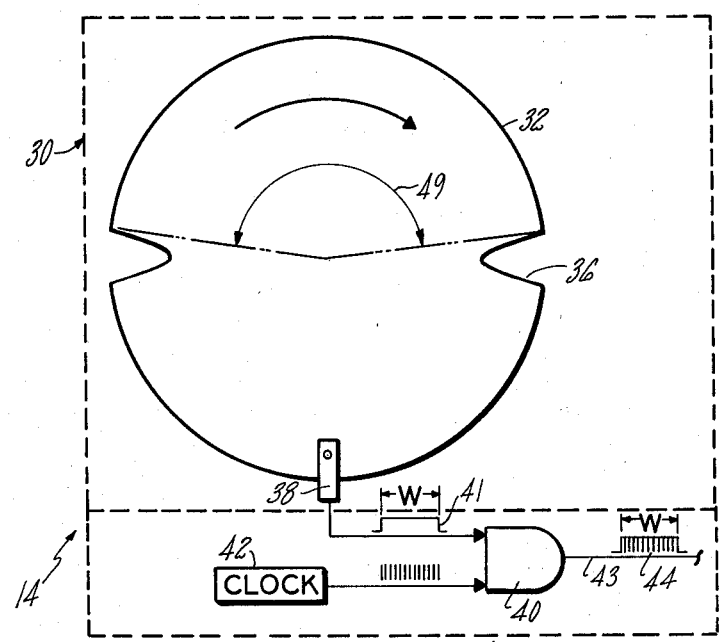

The sensor 14 includes a detector 30 for measuring the motor speed in response to the motor shaft. This disc may contain a number of "slits" 34, as shown in the embodiment in FIG. 5, or a single slit or cut 36 having a predetermined disc circumference width of a few degrees, as shown in FIG. 4. The sensor 30 further includes an energy detector or receiver 38 (photocell) and transmitter 37 (light source) which, in the embodiment in FIG. 4, transmits light through the slits to cause pulses 39 to be generated on the output of the detector 38. In the embodiment in FIG. 4, a single pulse 41 is generated by the motion of the disc. These pulses are supplied to one input to a gate 40 and the other input (41) receives the output from a clock 42. In the embodiment in FIG. 4 this clock produces at a frequency greater than that of the detector pulses, in other words, greater than the motor R.P.M., successive pulses. The detector pulse 41 gates these pulses to the gate output to produce a gate output signal 44 that consists of a pulse having a width w containing a number of the gated pulses. The number of pulses reflects the motor speed. As motor speed changes, w changes in proportion, thus proportionately changing the number of pulses in the signal 44. Alternatively, if the disc 32, shown in FIG. 5, is used, the clock 42 is used to generate a gate pulse 39 and the detector output comprises pulses, at a frequency greater than the clock frequency, which, in effect, divides the motor revolution into a number of increments. The frequency of the detector pulses and period are proportional to the motor speed. Obviously, in this embodiment the gate output signal 44 also consists of a number of pulses and this number reflects motor speed. Thus both versions of the sensor 14 produce an MS signal consisting of a pulse with a width w containing a number of sequential pulses whose number reflects the motor speed m. But in the embodiment in FIG. 4, w changes with motor speed.

The reference signal generator 18 is actuated by the first of these sequential pulses appearing in the MS signal and regardless of which sensor version (FIG. 4 or FIG. 5) is used, the purpose is to produce a fixed REF signal, when the MS signal is generated, so that the summation can be made synchronously in the summing circuit 16, in a usual manner.

An alternate embodiment obviously may use an N bit counter to generate a binary MS word, derived from the gate 40 output (signal 44), which would be summed in the subtractor 16 with a similar binary word from the reference generator 18. For example, the signal 44 may be supplied to the "clock" input of a binary counter which at the beginning of a gating sequence is reset to zero to reflect V MAX. On receipt of the clock pulses the counter increments so that at the end of the gating period the counter has been incremented by m times where m is the number of clock pulses during the gating period. After a small delay to allow for settling time required by the binary counter, a signal is generated for application to a store input on a latch causing the binary number contained in the counter and reflecting V to be transferred to the latch. After a further settling period a signal is generated to "reset" input of the binary counter and to cause the count in the counter to be returned to zero. On the commencement of the next gating signal the sequence is repeated.

To obtain a count proportional to the change in speed the frequency of the clock oscillator is preset as follows: First, the minimum gating pulse width is calculated (this occurs at maximum motor RPM) from the arc 49 of the motor disc. Second, the clock oscillator is adjusted to obtain $2^n$ clock pulses in the "minimum gating pulse width" where n is the number of stages of the binary counter. Third, the number transferred to the latch during each sequence will now be proportional to the difference between maximum RPM and motor RPM at other loads. For example:

| | |
|---|---|
| Max. motor RPM | = 1010 |
| Arc of motor disc | = 170° |
| Number of counter stages | = 12 |
| Revolutions/second | = $\frac{1010}{60}$ |
| | = 16.83 |
| Period for one revolution | = $\frac{1}{16.833}$ |
| | = 0.0594 secs. |
| Gating period | = $0.0594 \times \frac{170}{360}$ |
| | = 0.02805 secs. |
| No. of clock pulses req'd | = $2^{12}$ |
| | = 4096 |
| Counter clock frequency | = $\frac{4096}{0.02805}$ |
| | = 146024 Hz |

Even though the embodiment of the invention in the system in FIG. 1 focuses on generating the reference signal n in synchronism with the speed signal m, it is obvious that the speed and reference signals do not have to be generated sequentially; instead, the MS signal can be a binary word. This binary MS signal can be supplied to a summing circuit which also receives a binary REF signal reflecting V MAX. The two words can be subtracted to produce, at selected intervals the difference signal T whose magnitude will vary in proportion to the motor speed. The binary word reflecting the difference can be used to proportionately control the delay in the transmission of the stop and slowdown signals. Quite clearly, this type of approach may be easily accomplished through the use of a system employing a microprocessor, or discrete digital components.

Another embodiment of the invention may use a microprocessor in this manner, which is similar to that of the mentioned binary counter: An incremental counter in the processor counts between the beginning and end points of a pulse that reflects the motor speed. This pulse is provided from the motor speed sensor (such as the one shown above for the binary counter) and has a duration that varies in proportion to the motor speed and load. A base count reflecting maximum car velocity is stored in the microprocessor. When a stop or slowdown signal is generated, the microprocessor, in response, subtracts the base count from the most current incremental count to produce a difference count. The difference count is analogous to the DIF signal and, accordingly, may be used in the same manner to vary the delays.

A system of this type and others may utilize this extremely inexpensive, simple sensor apparatus: A piece of reflective metal tape is attached to the motor shaft which is painted flat black. A phototransistor is positioned close to the shaft where it can respond to the light reflected from the tape to produce a pulse. The duration of this pulse obviously varies in proportion to the motor speed and therefore proportionately reflects the load. Obviously, this sensor apparatus may also be used in conjunction with the discrete binary counter system mentioned earlier.

The foregoing is a description of the best mode for carrying out the invention and will suggest, to one skilled in the art, numerous modifications, variations and substitutions, in addition to those set forth, in and to the embodiments of the invention that has been shown and/or described, without departing from the true scope and spirit of the invention set forth in the claims that follow.

I claim:

1. An elevator system comprising a car, a motor, having a shaft coupled to the car, and brake system for stopping the car, a motor and brake operation control system including a system for generating a control signal to initiate car stopping operations at a fixed distance from each floor based upon a predetermined maximum car velocity (V MAX), and a load compensating system for modifying said operation based upon actual car velocity (V), said elevator system characterized in that said compensating system comprises:

a motor speed sensor coupled to the motor shaft for producing, at least once during each motor revolution, a digital motor speed (MS) signal reflecting V in relation to the angular velocity of the shaft, a reference signal generator for producing a predetermined digital reference (REF) signal manifesting the motor speed at V MAX, means for producing, from said REF and MS signals, a difference (DIF) signal reflecting the difference between V MAX and V, and means triggered by the control signal from the motor and brake operation system and responsive to said DIF signal for initiating the stopping operations after a delay following production of said control signal and for varying said delay in proportion to the difference between V MAX and V reflected by said DIF signal.

2. An elevator system according to claim 1, characterized in that said motor speed sensor comprises:

an energy transmitter, an energy detector, energy modulator means mounted on the motor shaft and positioned with respect to the transmitter and detector for modulating, during each shaft rotation, the energy transmitted between said detector and radiator for producing a detector output signal having characteristics proportionally reflecting the motor speed, and a signal generator responsive to said detector output signal for generating said MS signal.

3. An elevator system according to claim 2, characterized in that, said modulator produces, during each motor revolution, a detector output signal comprising at least one pulse, and varies the duration of said pulse in proportion to shaft rotational speed, and said signal generator produces an MS signal comprising a number of pulses, and varies said number in proportion to the duration of said detector output signal pulse.

4. An elevator system according to claim 2, characterized in that,
said modulator produces, within a motor revolution, a detector signal comprising a number of successive pulses, said number being proportional to the angular velocity, and
said signal generator produces, at intervals during each motor revolution, an MS signal comprising a lesser number of pulses and varies, at each interval, said lesser number in proportion to the number of said detector signal pulses produced during said interval.

5. An elevator system according to claim 3, characterized in that said signal generator comprises:
a clock generating a plurality of successive pulses at a frequency substantially greater than the frequency of said detector signal pulses, and
a gate receiving the clock output and said detector signal for gating a number of said clock pulses to the gate output during each detector signal pulse.

6. An elevator system according to claim 4, characterized in that said signal generator comprises:
a clock generating a plurality of successive pulses at a frequency less than the frequency of said detector signal pulses, and
a gate receiving the detector signal and said clock pulses for gating a number of said detector pulses to the gate output during each clock pulse.

7. An elevator system according to claim 2, characterized in that,
said modulator produces a detector signal comprising a pulse whose duration is proportional to the angular velocity of the motor shaft, and
said signal generator comprises means for generating, from said detector pulse, a binary word whose magnitude is proportional to the duration of said pulse.

8. An elevator system according to claim 7, characterized in that said binary word generator means comprises:
a clock, actuated by the detector signal pulse, generating clock pulses for the duration of the pulse, and
a binary counter, reset following each detector signal pulse and incremented by each clock pulse.

9. An elevator system according to any one of the claims 3, 4, 7 characterized in that,
said modulator means comprises a disc which rotates with the motor shaft and is slotted to periodically allow energy transmission from said transmitter to said detector.

10. An elevator system according to claim 9, characterized in that,
said energy transmitter is a light source, and
said detector is a photocell.

11. An elevator system according to any one of claims 1-8, characterized in that,
said triggered means produces a signal which is supplied to the motor and brake control system, after said delay, to initiate the stopping operation, said delay being proportional to said difference.

12. An elevator system according to any one of claims 1-8, characterized in that,
said trigger means produces, in response to a slowdown control signal, a first signal that is supplied to the motor control and brake control system, after a controllable delay, to initiate a motor slowdown sequence, and produces, in response to a subsequent stop control signal, a second signal, also supplied to the motor and brake control system after a second delay, initiating a stopping operation including stopping the motor and actuating the brake; said delays being proportional to the difference reflected by the DIF signal produced when their respective control signal is generated.

13. A method of controlling the operation of an elevator system of the kind comprising an elevator car and drive means, said drive means including a motor the speed of which varies according to the torque loading on it, brake means for halting the car and a component the angular velocity of which varies in proportion to said speed, said method being effective to bring the car to a halt at a floor level and comprising the steps of:
producing by sensor means a first signal indicative of the angular velocity of said component,
producing a reference signal,
comparing the first signal with the reference signal to derive a difference signal indicative of the weight carried by the car, and
controlling the operation of said drive means in response to said difference signal to compensate for weight carried by the car during the halting of the car at said floor level;
said step of controlling comprises the step of actuating said brake means for a period which varies in response to said difference signal.

14. A method according to claim 13 further comprising the steps of arranging said sensor means to produce a plurality of prospective first signals repetitively while said component is rotating and selecting one of the prospective first signals occurring when the speed of the car is substantially constant to be the first signal to be compared with the reference signal.

15. A method according to claim 14 wherein the selection of said first signal from said prospective first signals is effected by comparing each prospective first signal with said reference signal to produce a plurality of prospective difference signals and then selecting a prospective difference signal occurring at a time when the speed of the car is substantially constant to be the difference signal utilized for controlling the operation of the drive means.

16. A method according to claim 14 or claim 15 wherein said step of selecting is taken in response to a control signal issued at a predetermined time prior to arrival of said car at said floor level and subsequent to attainment by said car of a substantially constant velocity.

17. A method according to any one of claims 13, 14 or 15 wherein said step of controlling comprises the step of actuating said brake means at a second time which varies from a first time by an interval the duration of which is responsive to said difference signal, said first time being a predetermined time prior to arrival of said car at said floor level and subsequent to attainment by said car of a substantially constant speed.

18. A method according to claim 18 further comprising the steps of issuing a control signal at said first time, producing in response to said control signal and from a first signal produced at a time in close proximity to said first time, said difference signal, and actuating said brakes at an interval after said first time the duration of which is responsive to said difference signal.

19. A method according to any one of claims 13, 14 or 15 wherein said step of controlling comprises the step of actuating said brake means when said car is at a second distance which varies from a first distance by an amount which is responsive to said difference signal, said first distance being a predetermined distance from said floor level.

20. A method for controlling the operation of an elevator system of the kind comprising an elevator car, drive means, and control means, said drive means including a motor operable at a plurality of nominal speeds and the actual speed of which varies from said nominal speeds according to the torque loading on the motor, brake means for stopping the car; said control means issuing a first control signal at a predetermined time for changing said motor nominal speed to a slower nominal speed and issuing a second control signal at a later predetermined time for actuating said brake means, said first and said second control signals being issued at times when said car is travelling at a substantially constant speed; said method comprising the steps of:

producing in response to said first and said second control signals respective first and second difference signals, said first and second difference signal being produced by comparison of a reference signal with respective first and second sensor signals, each of which is indicative of the angular velocity of the motor at a time in close proximity to the time of issue of said first and said second control signals, respectively, changing the nominal speed of said motor from a fast to a slower speed at a time an interval after the production of said first control signal, said interval being variable as a function of said first difference signal, and actuating said brake means at a time an interval after the issue of said second control signal said interval varying in response to said second difference signal.

21. A method according to claim 20 further comprising the step of adjusting said reference signal so that it varies in direct proportion to a change in weight carried by said car.

* * * * *